United States Patent
King et al.

(10) Patent No.: US 7,325,154 B2
(45) Date of Patent: Jan. 29, 2008

(54) SERVICE REDUNDANCY

(75) Inventors: James E. King, Wokingham (GB);
Rhod J. Jones, Crowthorne (GB); Paul J. Garnett, Camberley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 343 days.

(21) Appl. No.: 10/838,844

(22) Filed: May 4, 2004

(65) Prior Publication Data

US 2005/0262393 A1    Nov. 24, 2005

(51) Int. Cl.
*G06F 11/00* (2006.01)
(52) U.S. Cl. .................. 714/4; 714/47; 714/48
(58) Field of Classification Search ............ 714/4, 714/47, 48
See application file for complete search history.

(56) References Cited

U.S. PATENT DOCUMENTS

| | | |
|---|---|---|
| 6,247,078 B1 | 6/2001 | Ebert et al. |
| 6,452,809 B1 | 9/2002 | Jackson et al. |
| 6,556,438 B1 | 4/2003 | Bolognia et al. |
| 6,583,989 B1 | 6/2003 | Guyer et al. |
| 6,594,150 B2 | 7/2003 | Creason et al. |
| 6,654,252 B2 | 11/2003 | Raynham |
| 6,742,068 B2 | 5/2004 | Gallagher et al. |
| 6,813,150 B2 * | 11/2004 | King et al. .............. 361/687 |
| 6,871,300 B1 * | 3/2005 | Irving ..................... 714/47 |
| 2002/0124114 A1 | 9/2002 | Bottom |
| 2003/0158933 A1 * | 8/2003 | Smith ..................... 709/224 |
| 2004/0028073 A1 * | 2/2004 | King et al. .............. 370/461 |
| 2004/0153700 A1 * | 8/2004 | Nixon et al. ............ 714/4 |
| 2004/0158766 A1 * | 8/2004 | Liccione et al. ........ 714/4 |

FOREIGN PATENT DOCUMENTS

| | | |
|---|---|---|
| EP | 1 117 038 | 7/2001 |
| EP | 1 286 265 | 2/2003 |
| GB | 2 393 817 | 4/2004 |

OTHER PUBLICATIONS

International Search Report and Written Opinion mailed Mar. 14, 2006 PCT/US2005/015756.

* cited by examiner

*Primary Examiner*—Michael C Maskulinski
(74) *Attorney, Agent, or Firm*—Meyertons Hood Kivlin Kowert & Goetzel, P.C.; B. Noël Kivlin

(57) ABSTRACT

An information processing system is provided. The information processing system comprises: an information processing subsystem including a processor and a processor support chip in data communication therewith. The processor support chip is operable to provide processor support functions for the processor, and comprises a local management entity. The system further comprises a remote management entity connected to communicate with a remote management network. The local management entity is connected to communicate with the remote management entity via a first management communication channel; and the local management entity is operable to monitor the remote management entity and, in response to detection of an error status of the remote management entity, to divert management communications to a second management communications channel bypassing the remote management entity to maintain communications with the remote management network.

34 Claims, 8 Drawing Sheets

SERVICE REDUNDANCY

BACKGROUND OF THE INVENTION

The present invention relates to service redundancy and in particular but not exclusively to redirection of a service channel in error conditions.

One application for the present invention relates to high density computer systems, for example, computer server systems for telecommunications applications. In telecommunications applications, it is important to provide high reliability and high capacity of operation. Various approaches have been taken to providing such high-performance, high reliability systems. Typically such systems are designed around providing redundant resources so that if one component of the system develops a fault, the system remains operational using the redundant resources. Fault tolerance can also be achieved, for example, with multiprocessor systems that provide redundancy through dynamic, e.g., software-controlled, task distribution. Providing redundant resources typically takes the form of duplication of components or devices such that if a given component or device fails, an identical unit can take over the function of the failed one.

The present invention relates to providing for redirection of service communication paths via alternative components in the event of a detected error condition.

SUMMARY OF THE INVENTION

A first aspect provides an information processing system. The information processing system comprises: an information processing subsystem including a processor and a processor support chip in data communication therewith. The processor support chip is operable to provide processor support functions for the processor, and comprises a local management entity. The system further comprises a remote management entity connected to communicate with a remote management network. The local management entity is connected to communicate with the remote management entity via a first management communication channel; and the local management entity is operable to monitor the remote management entity and, in response to detection of an error status of the remote management entity, to divert management communications to a second management communications channel bypassing the remote management entity to maintain communications with the remote management network.

This arrangement provides a self-monitoring computer system where an unhealthy entity in the service/management chain can be bypassed upon determination of an unhealthy state of that entity. Thus a high reliability can be attained.

In one embodiment, the remote management entity is operable to monitor the local management entity and, in response to detection of an error status of the local management entity, to divert management communications to a third management communications channel bypassing the local management entity to maintain communications with the processor support chip. This arrangement provides a mutual monitoring between two entities in the service/management chain, each being capable of causing the other to be bypassed in a detected unhealthy condition.

A second aspect provides an information processing system. The information processing system comprises: an information processing subsystem including a processor and a processor support chip in data communication therewith. The processor support chip is operable to provide processor support functions for the processor and comprises a local management entity. The system also comprises a remote management entity connected to communicate with a remote management network. The local management entity is connected to communicate with the remote management entity via a first management communication channel; and the remote management entity is operable to monitor the local management entity and, in response to detection of an error status of the local management entity, to divert management communications to a management communications channel bypassing the local management entity to maintain communications with the processor.

This arrangement provides a self-monitoring computer system where an unhealthy entity in the service/management chain can be bypassed upon determination of an unhealthy state of that entity. Thus a high reliability can be attained.

In one embodiment the local management entity is operable to monitor the remote management entity and, in response to detection of an error status of the remote management entity, to divert management communications to a third management communications channel bypassing the remote management entity to maintain communications with the remote management network. This arrangement provides a mutual monitoring between two entities in the service/management chain, each being capable of causing the other to be bypassed in a detected unhealthy condition.

Another aspect provides an information processing apparatus. The information processing apparatus comprises a processor support chip in data communication with a processor. The processor support chip includes a local management entity. A communications interface is provided for communication between a remote management entity and the local management entity, wherein the remote management entity is in data communication with a remote management network. In addition, the local management entity is operable to monitor a health status of the remote management entity and to, in the case of a detected non-satisfactory health status, divert management communication around the remote management entity via an alternative management communication path to the remote management network.

This arrangement provides an information processing subsystem for a computer system which allows a service/management chain to be self-monitoring and enabled to exclude an entity from that chain if that entity is determined not to be operating correctly. The monitored entity need not be a part of the subsystem, and can in fact be housed separately from the subsystem provided that a bypass channel is available.

BRIEF DESCRIPTION OF THE FIGURES

Embodiments of the present invention will be described hereinafter, by way of example only, with reference to the accompanying drawings in which like reference signs relate to like elements and in which.

Figure 1:
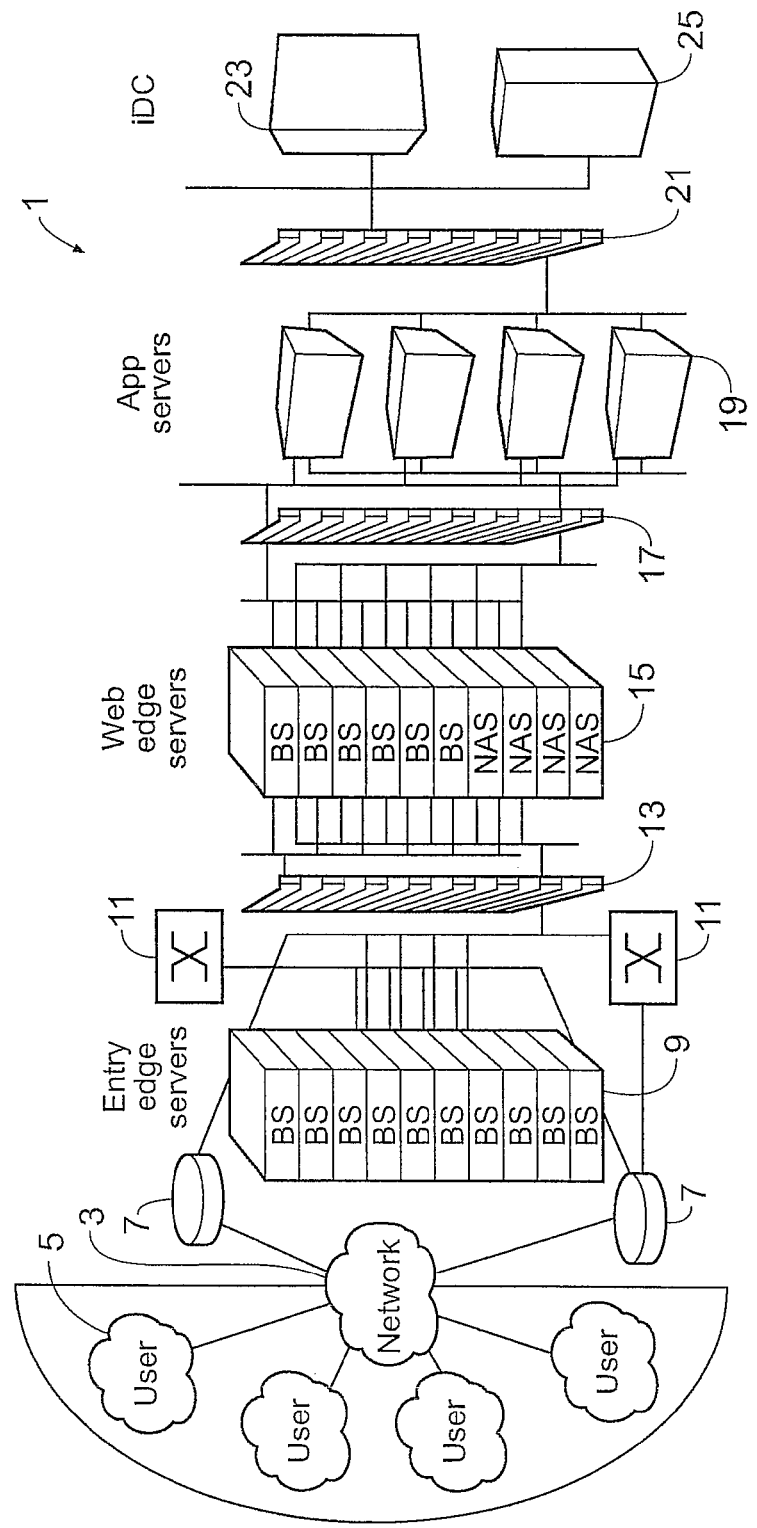
FIG. 1 is a schematic representation of an architecture of a multiprocessor system for supporting a web site being a first example of a computing environment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

Shown in FIG. 1 is a first example of a computing environment 1. This example is an application of a high capacity multiserver system 1 for implementing a network-connected web site such as, for example, an airline reservation system on the World Wide Web.

As shown in FIG. 1, an external network 3 (e.g., the Internet) for communicating with a user 5 can be connected to gateways 7 which can be connected to an entry edge server group 9 implemented by a web farm. The entry edge server group 9 forms an interface to the external network 3. The entry edge server group 9 can then be connected by switches 11 and a firewall 13 to a web edge server group 15 that can also be implemented as a web farm as shown in FIG. 1. The web edge server group 15 can serve to cache web pages that are readily accessible to users 5 accessing the system 1 from the external network 3, for example for checking flight times, etc. The web edge server group can comprise a number of blade server (BS) shelves and a number of network addressable storage (NAS) shelves for storing critical data. The web edge server group 15 can be further connected by a further firewall 17 to a plurality of application servers 19, which can be responsible for, for example, processing flight reservations. The application servers 19 can then be connected via a further firewall 21 to computer systems 23, 25, for example, e-commerce services including financial services for receiving and processing payment for airline reservations.

As will be appreciated, the server system described above with reference to FIG. 1 is only an example of a possible application for a multiprocessor server system. Multiprocessor server systems have many different applications and the present system is not limited to being applicable for use in only one or a limited number of such applications, rather multiprocessor server systems as described herein are operable for use in many different applications. A non-exhaustive list of such alternative applications includes: e-commerce web server systems; telecommunications network server systems; LAN application and file server systems and remote vehicle control systems.

Figure 2:
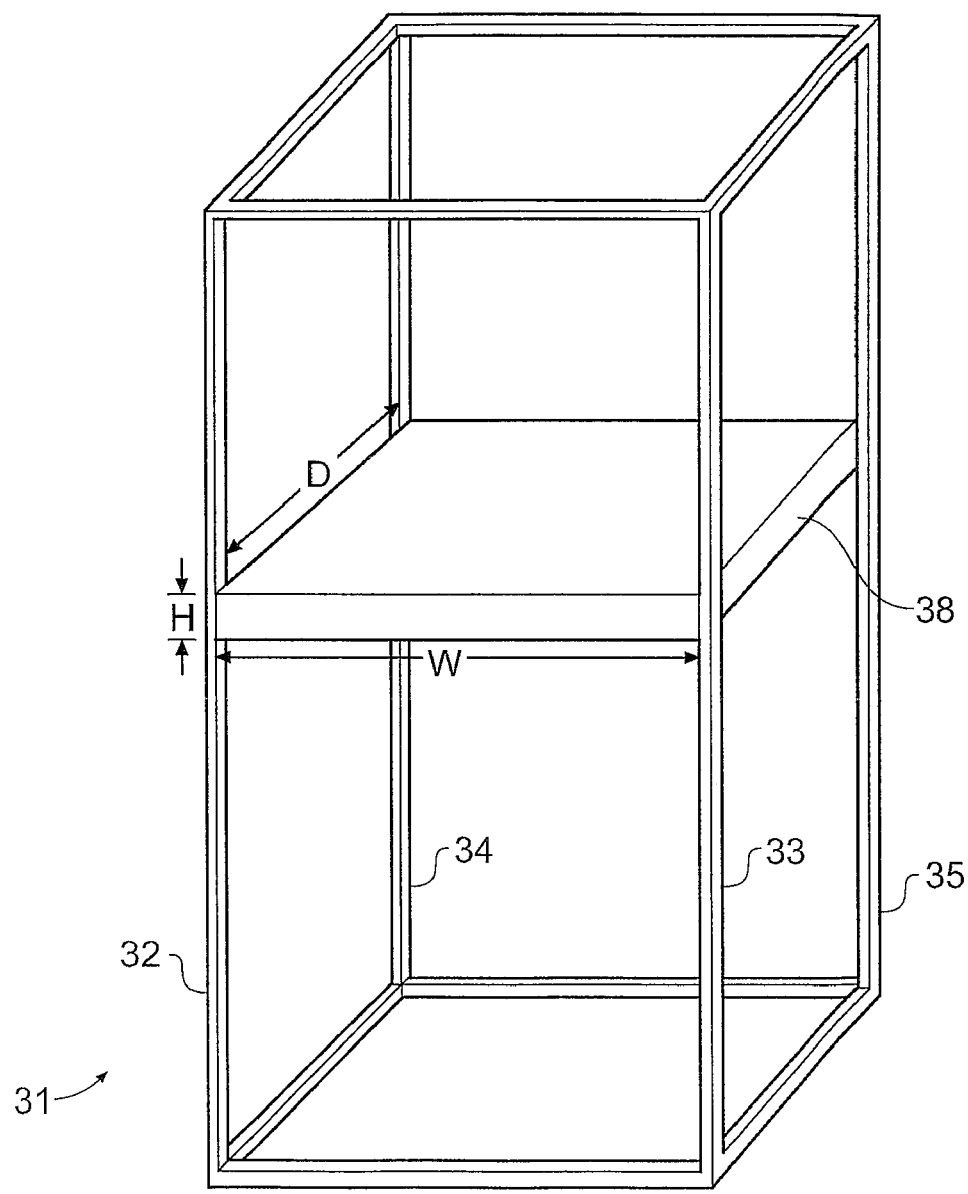
FIG. 2 is a schematic representation of a racking system incorporating an example of a computer system carrier in the form of a rack-mountable shelf.

With reference to FIG. 2, there is shown a schematic perspective representation of a rack system 31 as viewed from the front including left and right front uprights 32 and 33 and left and right rear uprights 34 and 35. A rack system of this type may be used to implement one or more of the server groups shown in FIG. 1. The uprights can be formed with apertures for receiving shelf fixings (e.g., screws, bolts, clips, etc., for mounting brackets, slides, rails, etc.).

Also shown in FIG. 2 is an example of a server shelf 38 mounted in the rack system 31. The shelf 38 provides a housing in which the components of the server computer are located.

The term "shelf" is used herein in a conventional way to describe a structure that is mountable in rack system 31 and is configured to carry one or more components to form at least a part of a rack-mountable system. In the present example, the shelf 38 is three-dimensional, having a height (H), width (W) and depth (D). In the present example, one dimension (hereinafter described as the height, H) is smaller than the other dimensions (hereinafter described as the depth, D, and the width, W) to facilitate mounting of the shelf within the rack system 31. It will be appreciated that although the width and depth are typically constrained by the dimensions of the racking system for which the shelf is designed, there is more freedom as regard the height, subject to taking account of any appropriate standards and packaging considerations.

In the present example the shelf 38 includes at least one processor. The shelf is operable as at least one server. In one example, there is a minimum of one processor provided for each server. In other examples, a single processor may be shared by a plurality of logical server entities.

Figure 3:
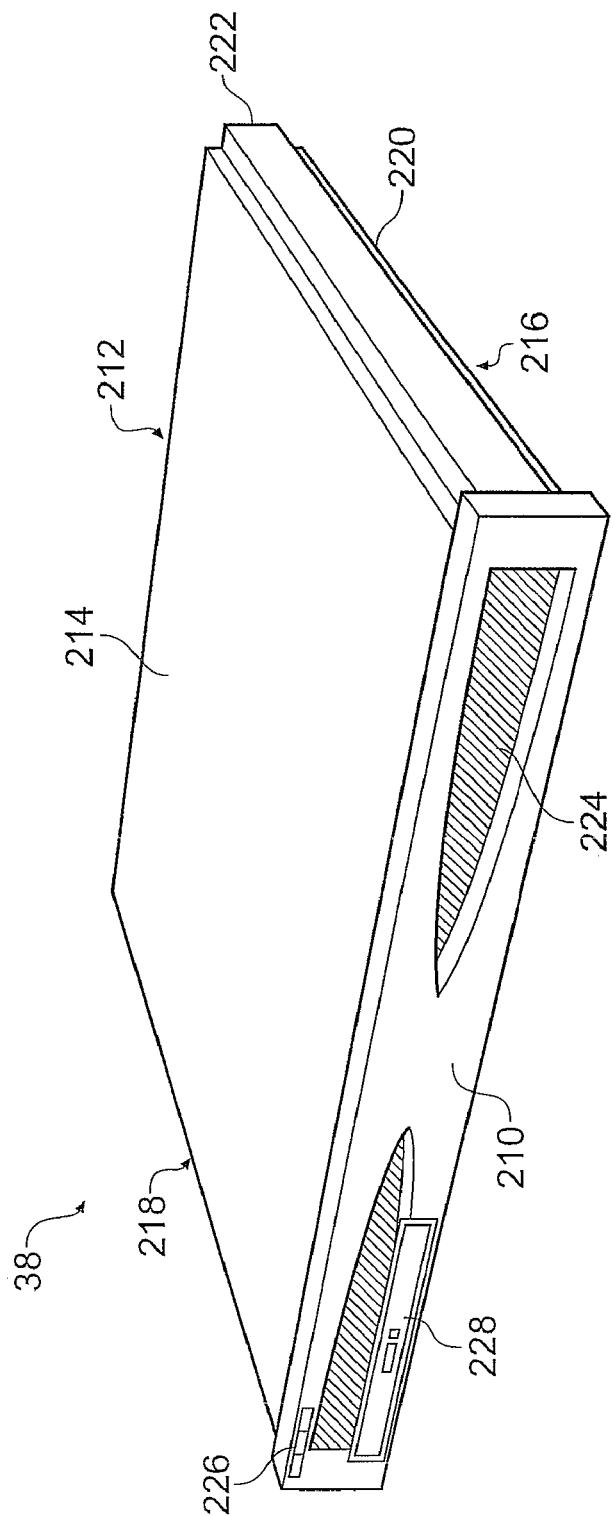
FIG. 3 is a schematic representation of an example of a rack mountable shelf for the racking system of FIG. 2.

The shelf 38 is shown in more detail in FIG. 3. The shelf can include top and bottom panels 214 and 216, side panels 218 and 220 and front and rear panels 210 and 212. The rear panel 212 can be provided with connectors (not shown) for connecting a power supply to the shelf and for connecting the shelf into one or more computer networks and can also be provided with ventilation apertures (not shown) for the flow of air into or out of the shelf. The side panels 218 and 220 can be provided with guide rails 222 for use in mounting the shelf into the racking system 31. The front panel 210 can include ventilation apertures 224 for the flow of air into or out of the shelf. A flow of air can be controlled by fans (not shown) which can cause air to enter the shelf via the apertures 224 and pass across components within the shelf and exit via apertures in the rear panel 212. The front panel can also have status indicator lights or LEDs 226 mounted therein for providing a visual indication of the operational status of the server housed within the shelf 38. The front panel 210 can also have mounted therethrough a removable media drive 228 such as a CD-ROM, a writeable CD, DVD-ROM, a writeable DVD, MO (magneto-optical), ZIP™ or floppy disk drive for the provision of data or software installation or updates to the server and/or for backup of data or software from the server.

Thus a first computing environment in which information processing devices are present has been described. A high capacity multiserver system of the type described above typically requires a high reliability of server systems utilised therein. In the stated example of an airline reservation system, extremely high availability of that system is essential for passengers to be able to book flights on the airline(s) using the reservation system. In another example, the high capacity multiserver system may be part of a communications network such as a telephone network. Again extremely high availability is required, in this example to ensure the telephone system is available for customers to make and receive calls. Therefore a high reliability of information processing cartridge is required.

Figure 4:
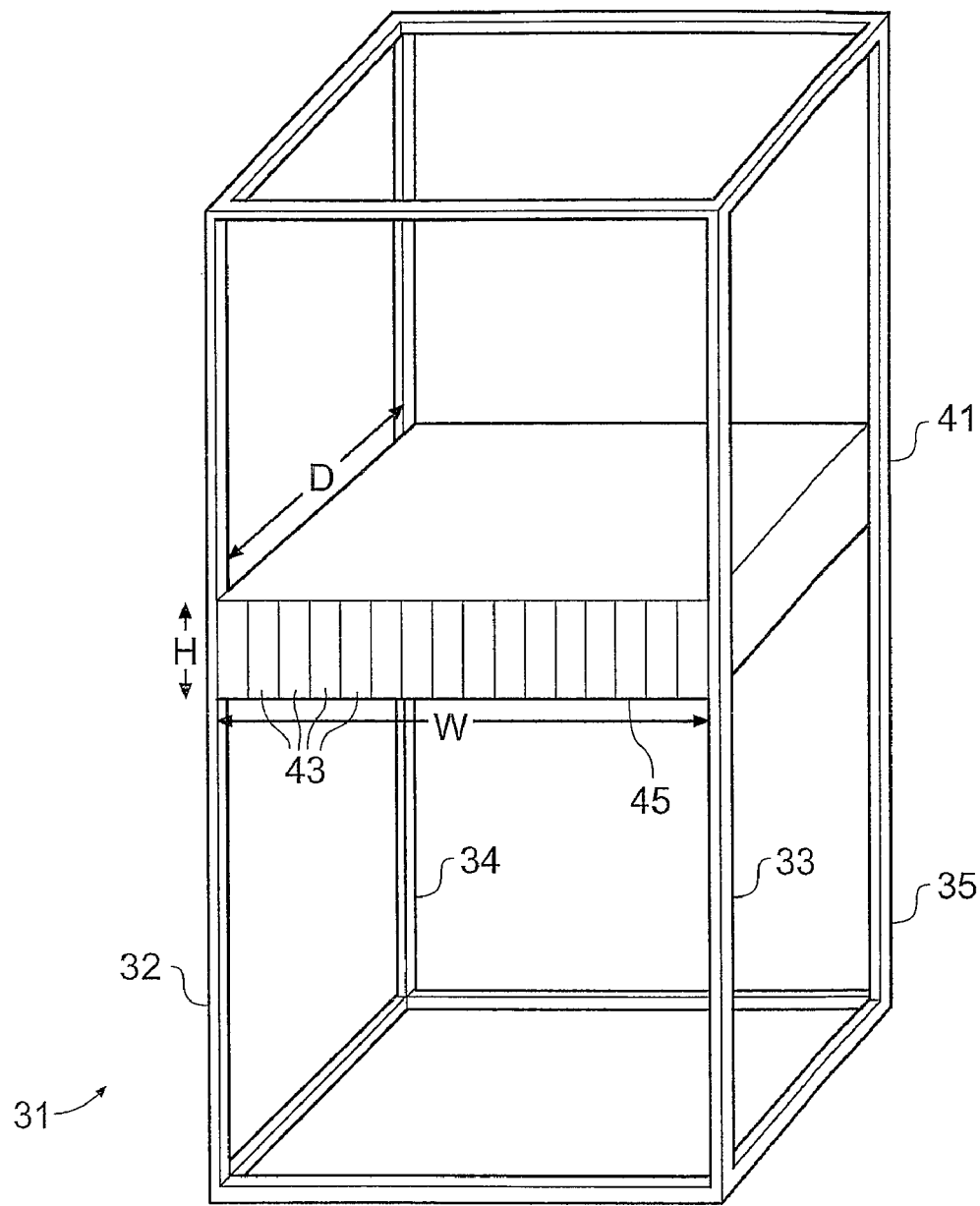
FIG. 4 is a schematic representation of a racking system incorporating another example of a computer system carrier in the form of a rack-mountable shelf.

Another example of a computing environment is shown in FIG. 4. With reference to FIG. 4, there is shown a schematic perspective representation of a rack system 31 similar to that shown in FIG. 2.

Also shown in FIG. 4 is an example of a blade server shelf 41 mounted in the rack system 31. The shelf 41 forms a carrier configured to carry a plurality of information processing cartridges 43 located side by side along the shelf.

Each of the information processing cartridges contains at least one processor. Each information processing cartridge in the present example is operable as a server. In some examples, the information processing cartridges can be configured as robust enclosed modules.

In the present example, the information processing cartridges, when aligned in the carrier shelf, look like rectangular slabs, or blades. Accordingly, an information processing cartridge can be described as a blade. The information processing cartridges 43 comprise information processing modules enclosed in an enclosure, or housing, so that the information processing modules have the form of cartridges. Also, as the information processing cartridges are to operate as computer servers in the example described in more detail presently, an information processing cartridge 43 can also be described as a server blade. Accordingly, in the context of this example, the terms module, cartridge and blade are used interchangeably.

The illustrated example of a shelf 41 is configured to carry sixteen information processing cartridges 43, each of which is removably mountable in a respective opening 45 in the front of the shelf, whereby the information processing cartridges can be inserted into and removed from the front of the shelf 41 without removing the shelf 41 from the rack system 31.

Thus a second computing environment in which information processing devices are present has been described. A high capacity multiserver system of the type described above typically requires a high reliability of server systems utilised therein. In the stated example of an airline reservation system, extremely high availability of that system is essential for passengers to be able to book flights on the airline(s) using the reservation system. In another example, the high capacity multiserver system may be part of a communications network such as a telephone network. Again extremely high availability is required, in this example to ensure the telephone system is available for customers to make and receive calls. Therefore a high reliability of information processing cartridge is required.

Figure 5:
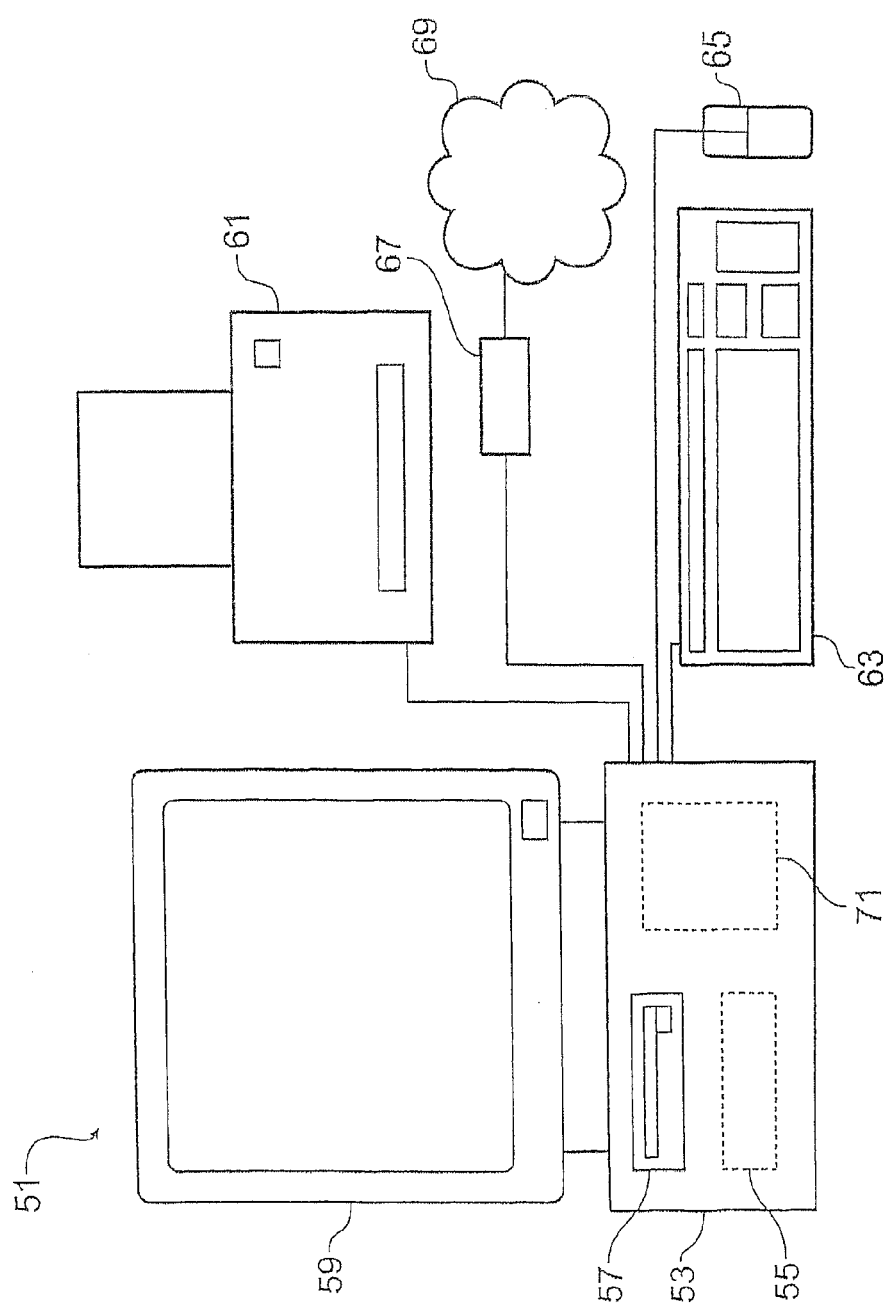
FIG. 5 is a schematic representation of a computer workstation being another example of a computing environment.

Another example of a computing environment is shown in FIG. 5. This example is a computer workstation 51. The workstation 51 includes a computer base unit 53, within which is an information processing subsystem 71. The base unit 53 can include an internal storage device 55 (such as a hard disk drive) for data and instructions storage, and an external storage device 57 (such as a floppy disk drive, an optical disk drive for compact disks or digital versatile disks, a magneto-optical drive, a magnetic tape drive or a solid state memory device) for data or instructions storage.

The base unit 53 can provide a video output for causing text and/or images to be displayed on an attached display unit 59. The base unit can also provide an output for causing a physical record making device 61 such as a printer or plotter to create a printed output. Input to the base unit 53 can be provided by a keyboard 63 and/or mouse 65.

A remote network communication device 67 such as a PSTN modem (public switched telephone network modulator/demodulator), DSL modem, or network interface device can also be provided. The remote network communication device 67 allows the workstation 51 to communicate with other computing environments connected to a remote network 69, such as The Internet.

A computer workstation of this type may be used to control a number of facilities within an office environment, such as climate control and lighting. Thus it is required to have high availability and accountability to ensure that office workers have appropriate climate and light conditions to work. Should the system require restarting for any reason, the system needs to be able to be restarted with the maximum accountability so that any faults can be easily traced and rectified.

Figure 6:
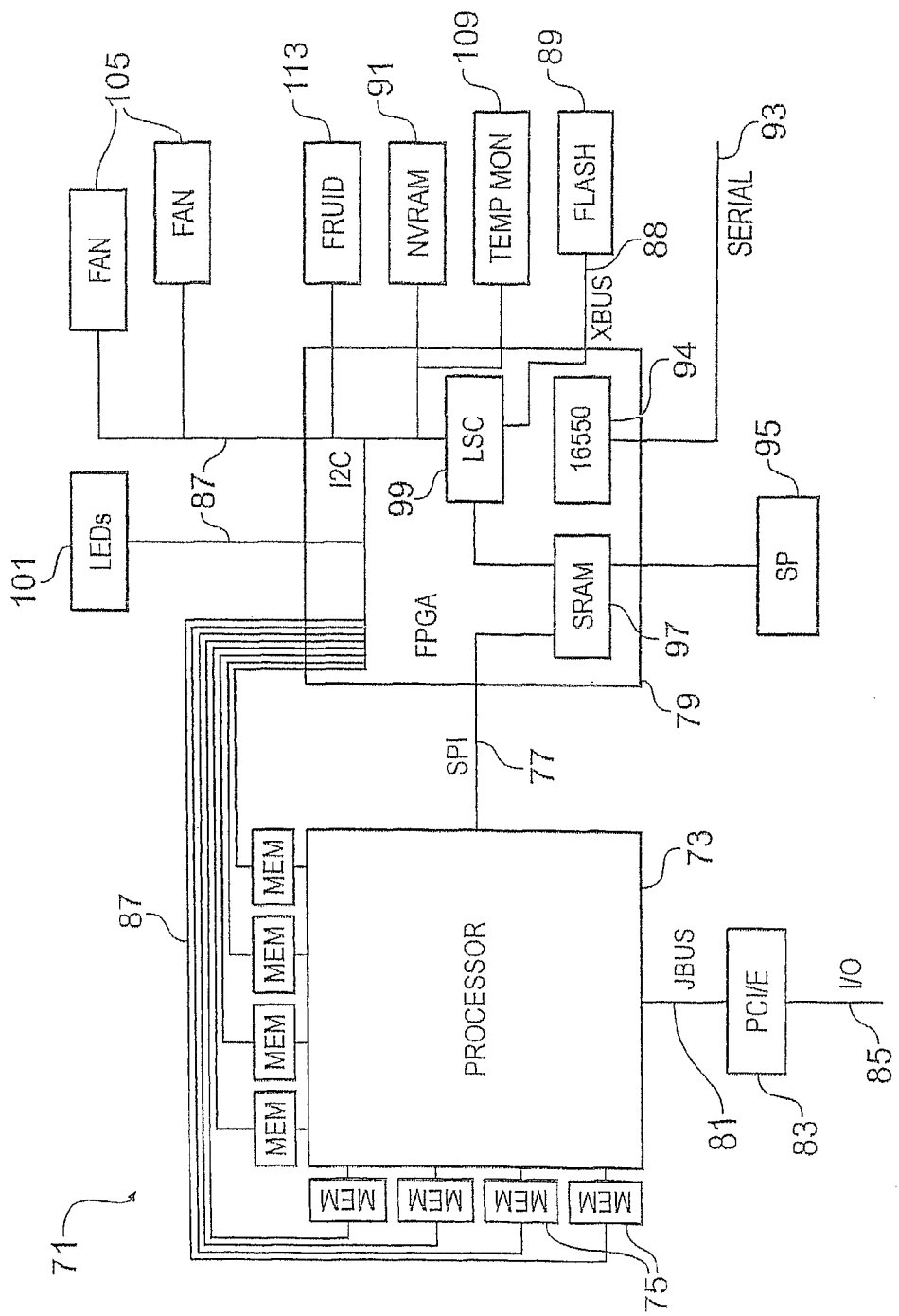
FIG. 6 is a functional block diagram of an example of part of an information processing subsystem for a computer system.

Thus there have been described three different computing environments in which a reliable and accountable information processing subsystem is utilised. With reference to FIG. 6, there will now be described an information processing subsystem suitable for deployment in a wide variety of computing environments.

FIG. 6 shows a part of an information processing subsystem 71 for a computer system. The subsystem 71 includes a microprocessor 73 which is provided with a plurality of memory modules 75. In the present example, the microprocessor 73 is a multi-core microprocessor, wherein each processor core of the microprocessor 73 is provided with a separate memory module 75. This microprocessor design corresponds to a new generation of microprocessors currently being developed by Sun Microsystems™. In other examples, alternative processors including the well-known SPARC™ and UltraSPARC™ processor from Sun Microsystems Inc., the x86 compatible processors from Intel and AMD corporations and the PowerPC processors from IBM corporation could be used.

The microprocessor 73 is operable to communicate with a processor support chip 79, which in the present example is provided by an FPGA (Field Programmable Grid Array), via an SPI (Serial Processor Interface) bus 77. The processor support chip 79 of the present example handles all of the support processes for the processor 73, for example bootstrap, system monitoring, management and many functions traditionally carried out by a Southbridge in x86 and similar computing systems.

The processor 73 of the present example is also provided with a JBus interface. JBus is an interface technology from Sun Microsystems Inc featuring a 128 bit packet switched, split transaction request and data bus providing high bandwidth and low latency. The JBus interface 81 enables the processor 73 to communicate with a PCI/E (Peripheral Component Interface Express) controller 83. In place of PCI/E, alternative I/O technologies such as InfiniBand™ or PCI/X may be used.

The PCI/E controller 83 provides conventional I/O channels 85 for communication with data storage devices such as hard disks and removable magnetic, optical or solid state disks and devices, as well as network devices for remote communication outside of the subsystem.

The processor support chip 79 is provided with I2C serial bus connections 87 for connecting to I2C components associated with the processor 73 and processor support chip 79. In order to provide for monitoring of the memory modules 75, they are connected to the processor support chip 79 via the I2C connections 87. Also provided and connected via I2C is NVRAM module 91 for storage of operational parameters of the processor 73 and processor support chip 79 during operation.

Connected to the processor support chip 79 via an Xbus or Ebus 88 is a FLASH PROM 89 for storing instructions for the boot procedure for the processor 73 and for storing configuration data and instructions for the processor support chip 79.

A serial connection 93 to the information processing subsystem 71 is provided via a UART 94 in the processor support chip 79. This serial connection can be controlled to allow a remote administrator (human or computer) to use a command line interface (CLI) to obtain information from and provide information and instructions to the processor 73.

The processor support chip 79 also has an interface for a service processor 95. The service processor 95 may be housed within the same module or casing as the information processing subsystem 71 or it may be provided in a separate physical entity. The service processor 95 may be configured to provide local management services for a number of separate information processing subsystems 71, which may all be located within a common housing or case, or may be in separate units. The service processor 95 can be given read access to an area of storage within the processor support chip 79 to facilitate efficient monitoring of the information processing subsystem with minimum overhead thereto. In the present example this area of storage is provided in the form of a SRAM 97 (described in more detail below).

The processor support chip 79 can also control and monitor a number of ancillary items which may be associated with a casing or housing in which the information processing subsystem 71 is housed. These can include status indicator LEDs 101. The LEDs can be used to indicate an operational status of the information processing subsystem and of other subsystems of an information processing apparatus of which the subsystem is a part. The LEDs can be controlled via the I2C connections 87.

The processor support chip 79 may also control and/or monitor one or more cooling fans 105. One or more of the cooling fans 105 may be arranged to cause a flow of cooling air through a housing or casing in which the information processing subsystem is located. One or more of the fans 105 may additionally or alternatively arranged to cause a flow of cooling air over specific components of the subsystem, for example the processor 73. The processor support chip can be arranged to monitor the speed of the fans and/or to control the speed of the fans. The monitoring and/or control of the fans can be performed via the I2C bus 87.

Also connected to the processor support chip 79 can be one or more temperature monitors 109. The temperature monitors 109 can be used to monitor temperature at various locations within a casing or housing in which the information processing subsystem 71 is located. Temperature monitoring sites may include a cooling flow inlet, a cooling flow outlet, and specific components such as the processor 73. The connection between the processor support chip 79 and the temperature monitor 109 can be the I2C bus 87. The processor support chip 79 I2C bus 87 can also provide a connection to a FRUID EEPROM 113. The FRUID EEPROM can contain a unique identifier by means of which a field replaceable unit (FRU) can be identified. In the present example, the FRUID EEPROM 113 can have an area of memory for the logging of data relating to system status events, such as system boot log data and software initialization log data.

The processor support chip can be internally subdivided along functional lines. One part may be configured to facilitate the boot process for the processor 73 and another part may be configured as an information processing subsystem service controller (hereinafter referred to as local service controller or LSC) 99. The LSC 99 may be configured to communicate with the remote service processor 95 for the execution of management operations. Instructions for the operation of the LSC may be stored within the FLASH memory 89 as a part of the instructions for the operation of the processor support chip. Also within the processor support chip 79 can be provided a SRAM 97. The SRAM 97 can be used for temporary storage of operational data for any component monitored or communicated with by the processor support chip 79.

Although individual connections have been shown between the processor support chip and the various I2C connected devices, a multiplexer could be used for implementing the connections to those devices.

Thus there has now been described an information processing subsystem which can be used in a variety of different computing environments. The subsystem includes a processing engine, data I/O facilities for the processing engine and management facilities for the subsystem.

Figure 7:
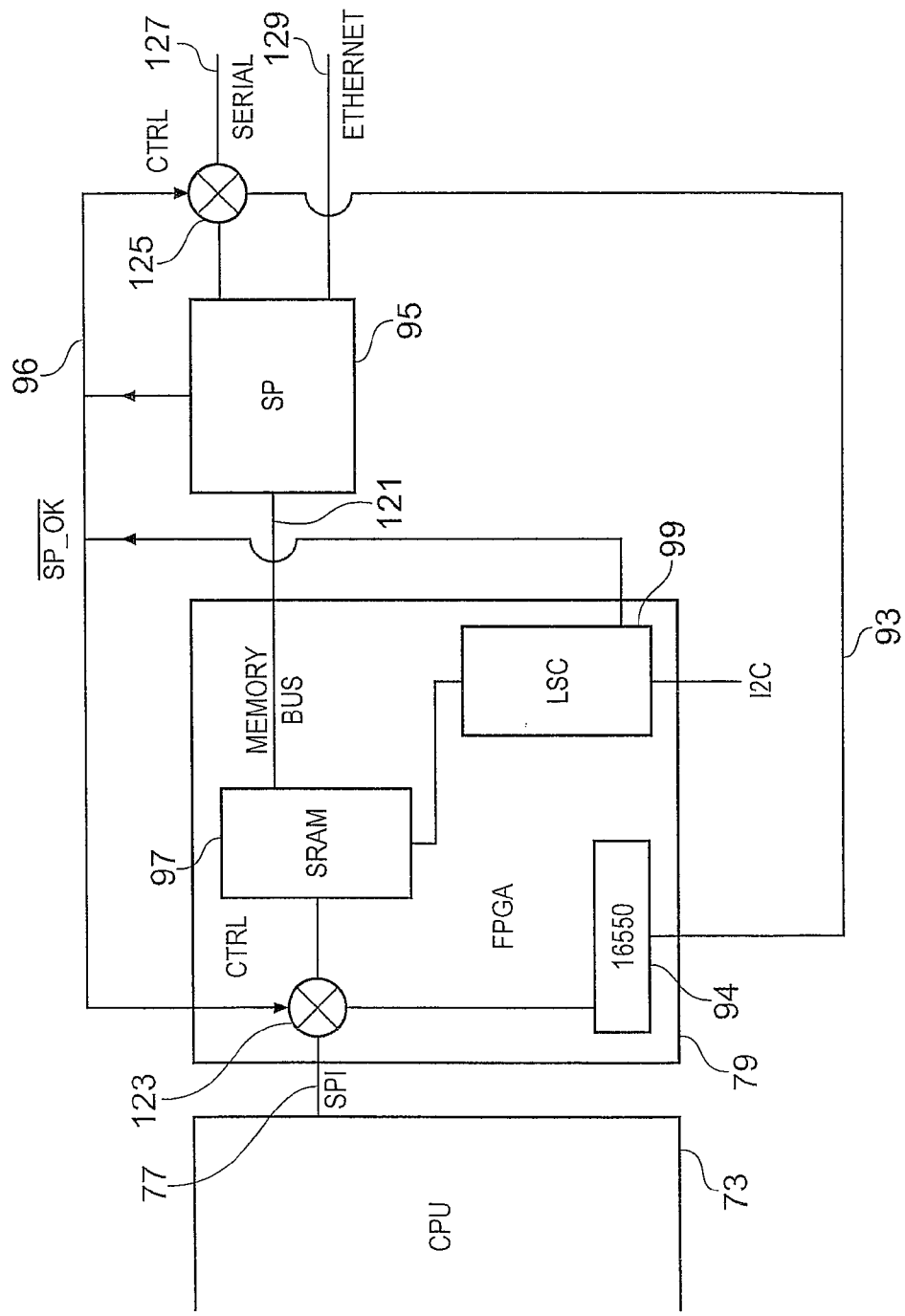
FIG. 7 is a functional block diagram showing an example of service connections in the example of FIG. 4.

With reference to FIG. 7, there will now be described in more detail the service connections to the subsystem 71.

As mentioned above, the processor support chip 79 has a number of interfaces to permit external connection. Amongst these interfaces is that which provides a connection to a service processor 95. In the present example, this interface is memory bus type interface. In other examples, this interface could be packages over a networking protocol link, suck as Ethernet or InfiniBand™ The memory bus 121 connects directly between the service processor 95 and the SRAM 97, providing a direct addressing path for the service processor 95 to read from and write to the SRAM 97.

The processor 73 is also operable to directly address the SRAM 97. The path for this is the SPI bus 77. Thus the processor 77 can read and write data directly to and from the SRAM. This data may include status reports, such as boot process status reports, shut-down process status reports and regular operational status reports. The LSC 99 is also operable to directly address the SRAM 97. The LSC 99 can both write to and from the SRAM over an internal connection within the processor support chip 79.

The provision of these paths for communication via the SRAM 97 allows each of the processor 73, service processor 95 and LSC 99 to communicate with one another. To simplify the communications, the SRAM can be internally subdivided into different areas. An example of the way in which the SRAM can be subdivided is shown in FIG. 8.

Figure 8:
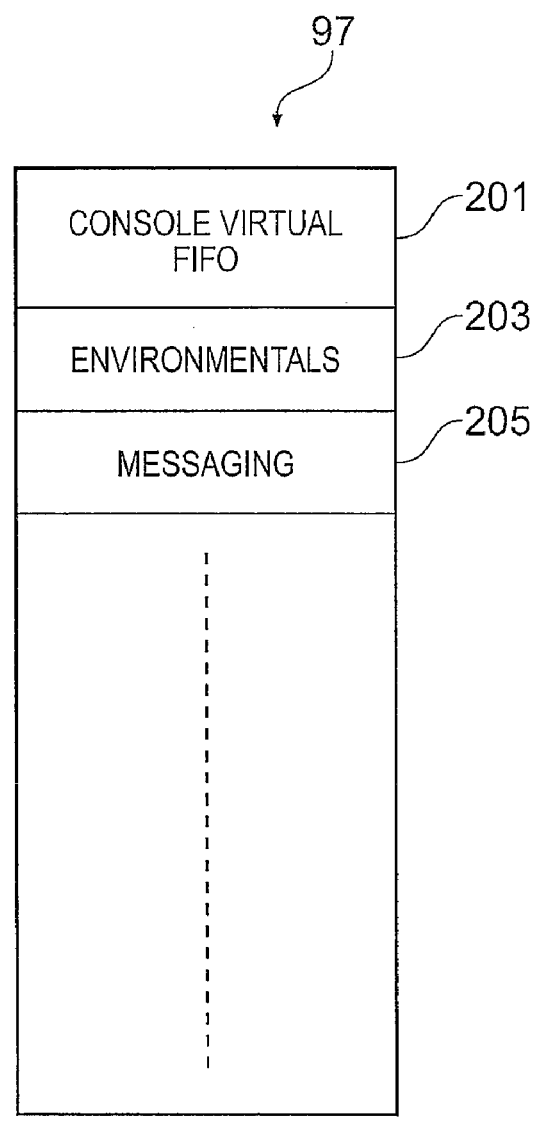
FIG. 8 is a schematic representation of how a memory space can be subdivided for storage of data relating to different aspects of a computer system's operation.

As shown in FIG. 8, the SRAM can have an area allocated as a console virtual fifo 201, which provides a virtual console connection to the processor 73. In the present example, the fifo (first-in-first-out buffer) is implemented as a ring buffer. When the processor 73 writes to its console communication channel, its output is directed to the console virtual fifo 201, from where it can be read by the service processor 95 and LSC 99. Similarly, the LSC 99 and service processor 95 write to the console virtual fifo 201 when they need to write to a console connection of the processor 73. The SRAM 97 can also have areas allocated to storage of environmental data 203 and messaging 205. The environmental data can take the form of temperature readings from temperature monitor 109, fan speed information for fans 105 and component health status messages. The messaging data can take the form of status reports generated by the processor 73 as described above. Some such status reports may be considered console information, whereas others maybe considered messaging information.

In order to provide a high reliability, as discussed above, providing redundant resources can increase fault tolerance by providing an alternative means for carrying out a given task or function. In the present example, to avoid the service processor 95 being a single point of failure, service processor bypass is provided.

In the present example, the service processor bypass uses the serial output 93 from the processor support chip 79 which uses a UART 94 within the processor support ship 79. During a failure mode operation, a switch 123 within the processor support chip 79 causes data received over the SPI 77 from the processor 73 destined for the console virtual fifo 201 to be diverted to the UART 94. The switch 123 also then diverts any data received via the UART 94 to the SPI 77 to provide a two-way path to the processor 73. The data output from the UART 94 over the channel 93 reaches a further switch 125. The switch 125, during the failure mode operation causes data received over the channel 93 to be diverted onto the serial connection 127 from the service processor 95. The switch 125 also causes data received over the serial channel 127 to be diverted to the path 93, thus completing the two-way path.

As will be appreciated, this by-pass only connects the serial channel 127 between the service processor 127 and a remote management entity (not shown) to the processor. The Ethernet channel 129 between the service processor 95 and a remote management entity is not serviced by the by-pass. However, the by-pass does provide a full console connection between the processor 73 and the remote management entity in the event of a failure of the service processor 95 occurring.

In order to determine when a service processor failure has occurred, and to correctly initiate appropriate failover processing, a service processor monitoring procedure is performed. In the present example this takes the form of a watchdog between the LSC 99 and the service processor 95.

In the present example, the LSC 99 is operable to monitor the health of the service processor 95. This monitoring can take many forms, the simples of which is to monitor for a reset condition of the service processor. Alternatives may include a qualitative analysis of data and/or instructions received from the service processor 95. As a result of this monitoring the LSC 99 is operable to determine an error condition in the service processor.

Upon determining such an error condition, the LSC 99 can assert a HIGH level on a $\overline{SP\_OK}$ control line 96. Asserting this line HIGH causes the switches 123 and 125 to divert the console connection via the by-pass channel 93. When no error condition has been detected the $\overline{SP\_OK}$ control line 96 is tied LOW to cause the switches 123 and 125 to allow all communication to pass through the SRAM 97 and service processor 95.

The arrangement of the example shown in FIG. 7 also provides for redirection of the console connection in the case of a detected LSC 99 or SRAM 97 error state. The service processor can monitor the health of the LSC 99 and SROM 97 much as the LSC can monitor the service processor 95. If the service processor 95 determines that the LSC 99 or SRAM 97 is experiencing an error condition, then the service processor can assert a HIGH level on the $\overline{SP\_OK}$ control line 96 to cause the by-pass channel 93 to be used. As the switch 123 and UART 94 are both located with the processor support chip 79 along with the SRAM 97 and LSC 99, it is possible that a failure of one or both of the SRAM 97 and LSC 99 would result from a total failure of the processor support chip 79. However, this is not necessarily the case and either of the SRAM 97 or LSC 99 could fail without the switch 123 and UART 94 failing.

The LSC 99 and service processor 95 can also be configured automatically to assert the $\overline{SP\_OK}$ control line 79 HIGH automatically when in a reset state. Thus when either the LSC 99 or the service processor 95 are in a reset state, the bypass path 93 is automatically invoked to allow a console connection from a remote management entity to the processor 73. This could be achieved, for example, by providing a pull-up on the $\overline{SP\_OK}$ control line 79.

Thus there has been described a system whereby a service communication channel can be diverted away from an intermediate management entity in a detected error state of that entity. The system also provides for a service communication channel to be diverted away from a local management entity in a detected error state of that entity. Thereby, communication between a processing entity and a remote management entity can be maintained, avoiding a single point of failure at either the local or intermediate management entities.

Thus there has been described an example of a system wherein mutual monitoring by potential single points of failure within the management systems of an information processing subsystem can be used to divert traffic around those elements in the case of an unacceptable status determined by the mutual monitoring. Reliability of the management systems and thus the entire system can thereby be increased.

As the skilled reader will appreciate, the arrangements of components and communications protocols given in the examples described with reference to FIGS. 5 and 6 are not the only possible arrangements. Other component combinations and layouts could be used, and other communications protocols could also be used.

The skilled reader will appreciate that an error condition or unhealthy condition of the LSC or service processor is not necessarily an outright failure of the hardware. The error or unhealthy condition may be triggered as a result of corrupted data being transmitted, or of unexpected commands being executed, such as commands associated with monitoring a boot process of the subsystem processor when no boot process has been initiated.

Although it has been described with reference to FIG. 7 that a by-pass communication channel is provided as a serial channel, in other examples a network-type channel could be used, for example, an Ethernet or Infiniband channel.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An information processing apparatus, comprising:
    a processor;
    a processor support chip coupled to the processor, wherein the processor support chip includes a local service controller, wherein the processor support chip further includes a buffer for storing data and instructions in transit between the processor and the local service controller; and
    a communications interface for communication between a service processor and the local service controller, wherein the service processor is coupled to a remote management network;
    wherein the local service controller is operable to monitor a health status of the service processor, wherein, in response to detecting a nonsatisfactory health status, the local service controller is configured to divert management communication around the service processor via an alternative management communication path to the remote management network.

2. The apparatus of claim 1, wherein the local service controller is operable to monitor signals received from the service processor and to perform a qualitative assessment thereof to determine the health status.

3. The apparatus of claim 1, wherein the local service controller is operable to monitor a reset status of the service processor to determine the health status.

4. The apparatus of claim 1, wherein the alternative management communication path provides a direct communications channel from the processor to the remote management network.

5. The apparatus of claim 1, wherein the alternative management communication path comprises a serial channel.

6. The apparatus of claim 1, wherein the alternative management communication path comprises a network channel.

7. The apparatus of claim 1, wherein the alternative management communication path comprises a separate physical channel to the management communication path.

8. The apparatus of claim 1, wherein the alternative management communication path comprises a physical channel at least part shared with the management communication path.

9. The apparatus of claim 1, wherein the local service controller comprises a physical interface for the management communication path and the alternative management communication path.

10. The apparatus of claim 9, wherein the physical interface for the management communication path and the physical interface for the alternative management communication path are provided by a common physical interface.

11. The apparatus of claim 1, wherein the processor support chip further comprises a buffer for storing data and instructions in transit between the processor and the service processor.

12. The apparatus of claim 1, wherein the processor support chip further comprises a buffer for storing data and instructions in transit between the processor and the remote management network.

13. The apparatus of claim 1, wherein the processor support chip further comprises a switch operable to divert management communication via the alternative management communication path responsive to a service processor health status signal.

14. The apparatus of claim 1, wherein the service processor is operable to monitor a health status of the local service controller, wherein, in response to detecting a non-satisfactory health status, the service processor is configured to divert management communication around the local service controller via the alternative management communication path.

15. The apparatus of claim 14, wherein the service processor is operable to monitor signals received from the local service controller and to perform a qualitative assessment thereof to determine the health status.

16. The apparatus of claim 1, wherein the service processor is located in a separate housing to a housing in which the processor support chip and local service controller are located.

17. An information processing system, comprising:
an information processing subsystem comprising a processor and a processor support chip in data communication therewith, wherein the processor support chip includes a local service controller, wherein the processor support chip further includes a buffer for storing data and instructions in transit between the processor and the local service controller; and
a service processor coupled to the information processing subsystem and configured to communicate with a remote management network;
wherein the local service controller is configured to communicate with the service processor via a first management communication channel;
wherein the local service controller is operable to monitor the service processor and, in response to detection of an error status of the service processor, to divert management communications to a second management communications channel to bypass the service processor and still maintain communications with the remote management network.

18. The system of claim 17, wherein the local service controller is operable to monitor signals received from the service processor and to perform a qualitative assessment thereof to determine the error status.

19. The system of claim 17, wherein the local service controller is operable to monitor a reset status of the service processor to determine the error status.

20. The system of claim 17, wherein the second management communication channel comprises a serial channel.

21. The system of claim 17, wherein the second management communication channel provides a direct communications path from the processor to the remote management network.

22. The system of claim 17, wherein the service processor is operable to monitor the local service controller and, in response to detection of an error status of the local service controller, to divert management communications to the second management communications channel.

23. The system of claim 22, wherein the service processor is operable to monitor signals received from the local service controller and to perform a qualitative assessment thereof to determine the error status.

24. The apparatus of claim 17, wherein the service processor is located in a separate housing to a housing in which the processor support chip and local service controller are located.

25. An information processing system, comprising:
an information processing subsystem comprising a processor and a processor support chip in data communication therewith, wherein the processor support chip includes a local service controller; and
a service processor coupled to the information processing subsystem and configured to communicate with a remote management network;
wherein the local service controller is configured to communicate with the service processor via a first management communication channel;
wherein the service processor is operable to monitor the local service controller and, in response to detection of an error status of the local service controller, to divert management communications to a second management communications channel to bypass the local service controller and still maintain communications with the processor.

26. The system of claim 25, wherein the service processor is operable to monitor signals received from the local service controller and to perform a qualitative assessment thereof to determine the error status.

27. The system of claim 25, wherein the second management communication channel comprises a serial channel.

28. The system of claim 25, wherein the second management communication channel comprises a network channel.

29. The system of claim 25, wherein the second management communication channel provides a direct communications path from the remote management network to the processor.

30. The system of claim 25, wherein the second communication channel bypasses the service processor.

31. The apparatus of claim 30, wherein the local service controller is operable to monitor the service processor and, in response to detection of an error status of the service processor, to divert management communications to the second management communications channel.

32. The apparatus of claim 31, wherein the local service controller is operable to monitor signals received from the service processor and to perform a qualitative assessment thereof to determine the error status.

33. The apparatus of claim 31, wherein the local service controller is operable to monitor a reset status of the service processor to determine the error status.

34. The apparatus of claim 25, wherein the service processor is located in a separate housing to a housing in which the processor support chip and local service controller are located.

* * * * *